United States Patent [19]
Bernstein

[11] 3,789,072
[45] Jan. 29, 1974

[54] CARBOXAMIDES
[75] Inventor: Jack Bernstein, New Brunswick, N.J.
[73] Assignee: E. R. Squibb & Sons, Inc., New York, N.Y.
[22] Filed: Apr. 22, 1970
[21] Appl. No.: 30,989

Related U.S. Application Data
[63] Continuation-in-part of Ser. No. 670,795, Sept. 26, 1967, abandoned, which is a continuation-in-part of Ser. No. 464,226, June 15, 1965, abandoned.

[52] U.S. Cl....... 260/557 B, 260/239 B, 260/243 B, 260/274.1, 260/247.2 A, 260/247.5 R, 260/247.7 A, 260/268 R, 260/268 MK, 260/293.73, 260/293.77, 260/293.79, 260/293.83, 260/293.84, 260/306.3, 260/326.5 M, 260/326.8, 260/326.82, 260/558 P, 260/558 S, 260/570.5 R, 260/570.5 C, 260/570.5 S, 260/570.7, 260/240 R, 260/240 K, 424/244, 424/246, 424/248, 424/250, 424/267, 424/274, 424/324
[51] Int. Cl. ......................................... C07c 103/30
[58] Field of Search......... 260/557, 558, 559, 240, 260/326.3, 297.1, 247.2, 293, 268, 239, 260/293.4, 294

[56] References Cited
OTHER PUBLICATIONS
Stetter et al., Angew. Chemie, Vol. 74, pp. 361-396 (1962).

Primary Examiner—Harry I. Moatz
Attorney, Agent, or Firm—Lawrence S. Levinson; Merle J. Smith; Donald J. Perrella

[57] ABSTRACT

This invention relates to new compounds of the formula

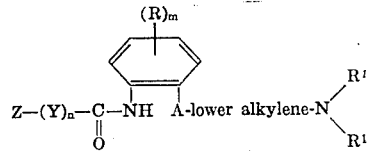

and acid addition and quaternary ammonium salts thereof, substances which have serotonin inhibitory, hypotensive and analgesic activities.

11 Claims, No Drawings

CARBOXAMIDES

This application is a continuation-in-part of application Ser. No. 670,795, filed Sept. 26, 1967, now abandoned, which in turn is a continuation-in-part of application Ser. No. 464,226, filed June 15, 1965, now abandoned.

SUMMARY OF THE INVENTION

This invention relates to new bases of the formula

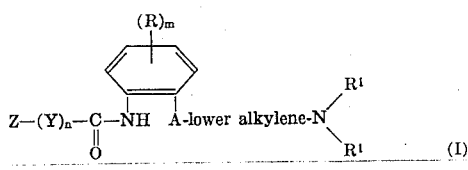

wherein R represents hydrogen, halogen, trifluoromethyl, nitro, amino, lower alkyl, lower alkoxy and lower alkanoyl; A represents oxa (—O—), thia (—S—), sulfinyl

sulfonyl (—SO$_2$—), carbonyl

and hydroxymethylene [—CH(OH)—]; Y represents a one to two carbon saturated or unsaturated chain [i.e., —CH$_2$—, —CH$_2$CH$_2$—, —CH=CH—]; Z represents adamantyl and substituted adamantyl [i.e., 3—R$^2$—5—R$^2$-adamantyl] but when R$^1$ represents an adamantyl group, Z is then phenyl; m represents 1 to 3; n represents 0 or 1 and

is a basic nitrogen containing radical of less than 14 atoms, and addition salts and quaternary ammonium salts of those bases.

In the basic nitrogen containing radical symbolized by

in formula I, each R$^1$ represents hydrogen, adamantyl, substituted adamantyl (only one R$^1$ being adamantyl or substituted adamantyl), lower alkyl, hydroxy-lower alkyl and phenyl lower alkyl forming such basic groups as amino, lower alkylamino, e.g., methylamino, ethylamino, di(lower alkyl)amino, e.g., dimethylamino, diethylamino, dipropylamino, (hydroxy-lower alkyl)amino, e.g., hydroxy-ethylamino, di(hydroxy-lower alkyl)amino, e.g., di(hydroxy-ethyl)amino, phenyl(-lower alkyl)amino, e.g., benzylamino, phenethylamino, N-(lower alkyl)phenyl (lower alkyl)amino, e.g., N-methylbenzylamino, and the like.

In addition, the nitrogen may join with the groups represented by R$^1$ to form a five to seven-membered monocyclic heterocyclic containing, if desired, an oxygen, sulfur or an additional nitrogen atom, (not more than two hetero atoms altogether). The heterocyclic group may also be substituted by one or two groups represented by R.

Thus heterocyclic groups represented by the radical II include, for example, piperidino, (lower alkyl)-piperidino, e.g., methylpiperidino, di(lower alkyl)-piperidino, e.g., 2,3- or 2,4-dimethylpiperidino, (lower alkoxy)piperidino, e.g., 4-methoxy-piperidino, pyrrolidino, (lower alkyl)pyrrolidino, e.g., 2- or 3-methylpyrrolidino, di(lower alkyl)pyrrolidino, e.g., 2,3-dimethylpyrrolidino, (lower alkoxy)pyrrolidino, e.g., 4-ethoxy-pyrrolidino, (N-lower alkyl)pyrrolidino, e.g., (N-methyl)pyrrolidino, morpholino, (lower alkyl)morpholino, e.g., N-methylmorpholino or 2-methylmorpholino, di(lower alkyl)morpholino, e.g., 2,3-dimethyl-morpholino, (lower alkoxy)morpholino, e.g., 3-ethoxymorpholino, thiamorpholino, (lower alkyl)thiamorpholino, e.g., N-methylmorpholino or 2-methylthiamorpholino, di(lower alkyl)thiamorpholino, e.g., 2,3-diethylthiamorpholino, 2,3-dimethylthiamorpholino, (lower alkoxy)thiamorpholino, e.g., 2-methoxythiamorpholino, piperazino, (lower alkyl)piperazino, e.g., 4-methylpiperazino, 2-methyl-piperazino, hydroxy-lower alkyl piperazino, e.g., 4-(2-hydroxy-ethyl)piperazino, di(lower alkyl)piperazino, e.g., 2,3-dimethyl-piperazino, hexamethyleneimino and homopiperazino.

The lower alkyl groups represented by the symbols include straight and branched chain saturated aliphatic groups of up to seven carbon atoms such as methyl, ethyl, propyl, isopropyl, butyl, isobutyl, t-butyl, amyl, isoamyl, hexyl and the like. Methyl and ethyl are preferred. The lower alkoxy groups contain alkyl groups of the same character attached to the oxygen atom. The term "lower alkylene" includes such straight and branched chain aliphatic groups having up to seven carbon atoms.

Each of the four common halogens is contemplated by the term "halo," but chlorine and bromine are preferred.

The lower alkanoyl groups are the acyl moities derived from lower fatty acids of up to seven carbon atoms containing alkyl groups of the character described above and include, for example, acetyl, propionyl, butyryl, and the like.

The adamantyl group represented by R$^1$ and Z include unsubstituted adamantyl and simply substituted adamantyl, e.g., 3-R$^2$, 5-R$^2$-adamantyl, wherein each R$^2$ represents hydrogen, halogen, lower alkyl, hydroxy or lower alkoxy of which the first three are preferred. Each R$^2$ is preferably hydrogen when the adamantyl group is attached at the 2-position. The halogen, lower alkyl and lower alkoxy groups are the same as those described above. As indicated previously, Z is adamantyl or substituted adamantyl except when an R$^1$ represents an adamantyl group. In that instance, Z is phenyl. Only one R$^1$ is an adamantyl group, then the other R$^1$ is preferably hydrogen or lower alkyl. There is thus but one adamantyl group in the molecule, preferably bonded at the 1-position of the adamantyl ring.

The preferred members of the class defined by formula I are those wherein R is hydrogen, A is thia, the radical II is di(lower alkyl)amino, especially dimethylamino, the lower alkylene group has three carbon atoms, Y has two carbon atoms, n is 1 and Z is 1-adamantyl. In all instances lower alkyl groups of less than four carbons are preferred. When A is other than oxygen, m is preferably 1 and R is hydrogen, lower alkyl, halogen or amino, especially the first two.

The compounds of this invention may be preferred by a variety of methods. The preferred and general method for preparing the compounds of this invention involves reacting a compound of the general formula III:

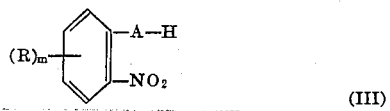

wherein A is oxa or thia and R and m are as hereinbefore defined, with a compound of the formula IV:

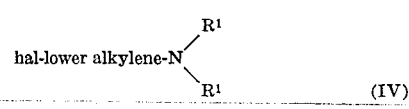

wherein hal represents a halogen, preferably chlorine or bromine and $R^1$ is as hereinbefore defined, the reaction being carried out in the presence of a strong base, such as sodamide, sodium methylate, sodium hydroxide, sodium hydride and potassium hydroxide, to yield a compound of the formula

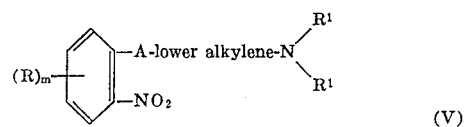

wherein R, $R^1$, m and A are as hereinbefore defined.

Suitable starting materials of the formula III utilized in the process of this invention include: 2-nitro-phenol; 2-nitrobenzenethiol; halo-2-nitrophenols, such as 4-chloro-2-nitrophenol, 4-bromo-2-nitrophenol, 5-chloro-2-nitrophenol, 5-bromo-2-nitrophenol, 6-chloro-2-nitrophenol, 4,6-dichloro-2-nitrophenol and 4-bromo-6-chloro-2-nitrophenol; halo-2-nitrobenzenethiols, such as 4-chloro-2-nitrobenzenethiol, 4-bromo-2-nitrobenzenethiol, 5-chloro-2-nitrobenzenethiol and 4,6-dichloro-2-nitrobenzenethiol; trifluoromethyl-2-nitrophenols, such as 4-trifluoromethyl-2-nitrophenol and 5-trifluoromethyl-2-nitrophenol; trifluoromethyl-2-nitrobenzenethiols, such as 4-trifluoromethyl-2-nitrobenzenethiol and 5-trifluoromethyl-2-nitrobenzenethiol; (lower alkyl)-2-nitrophenols, such as 4-methyl-2-nitrophenol, 5-ethyl-2-nitrophenol, 4-isopropyl-2-nitrophenol, 5-n-hexyl-2-nitrophenol, 4,6-dimethyl-2-nitrophenol, 3,4,5-trimethyl-2-nitrophenol, 4,6-diethyl-2-nitrophenol, and 3-methyl-5-ethyl-2-nitrophenol; (lower alkyl)-2-nitrobenzenethiols, such as 5-methyl-2-nitrobenzenethiol, 4-ethyl-2-nitrobenzenethiol, 4,6-dimethyl-2-nitrobenezenethiol, and 3,4,5-trimethyl-2-nitrobenzenethiol; (lower alkoxy)-2-nitrophenols, such as 4-methoxy-2-nitrophenol, 5-ethoxy-2-nitrophenol, 4-propoxy-2-nitrophenol, 4,6-diethoxy-2-nitrophenol and 3,4,5-trimethoxy-2-nitrophenol; (lower alkoxy)-2-nitrobenzenethiols, such as 4-methoxy-2-nitrobenzenethiol, 5-ethoxy-2-nitrobenzenethiol, 4,6-diethoxy-2-nitrobenzenethiol and 3,4,5-trimethoxy-2-nitrobenzenethiol; (lower alkanoyl)-2-nitrophenol, such as 4-acetyl-2-nitrophenol, 5-acetyl-2-nitrophenol, 3-propionyl-2-nitrophenol and 5-hexanoyl-2-nitrophenol; and (lower alkanoyl)-2-nitrobenezenethiols, such as 4-acetyl-2-nitrobenzenethiol, 5-acetyl-2-nitrobenzenethiol, 3-propionyl-2-nitrobenzenethiol and 5-hexanoyl-2-nitrobenzenethiol. These compounds are prepared by the classic methods in the literature.

The nitro group is then reduced catalytically, as by treatment with hydrogen in the presence of a hydrogenation catalyst, such as 5% palladium-carbon, or chemically, as by treatment with stannous chloride or sodium hydrosulfite, to yield intermediates of this invention of the general formula VI;

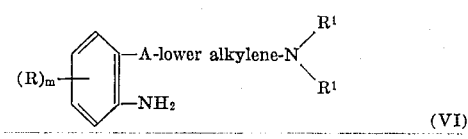

wherein the symbols are as hereinbefore defined, and the resulting amine is then reacted with a compound of the formula VII:

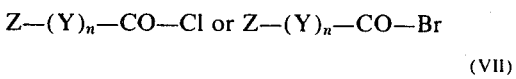

wherein Z, Y and n are as hereinbefore defined, to yield the final products of this invention.

Suitable starting materials of formula VII include, for example, 1-adamantane carboxylic acid chloride, 3-methyl-1-adamantane carboxylic acid chloride, 3-phenyl-1-adamantane carboxylic acid chloride, 3-methoxy-1-adamantane carboxylic acid chloride, 3-fluoro-, 3-chloro-, 3-bromo and 3-iodo-1-adamantane carboxylic acid chloride, 3,5-dimethyl-1-adamantane carboxylic acid chloride, 1-adamantylacetyl chloride, 3-(1-adamantyl)acryloyl chloride and the like and when Z is phenol, benzoyl chloride, phenacetyl chloride, cinnamoyl chloride and the like.

The acid chlorides are produced by reacting an unsubstituted or substituted adamantanecarboxylic acid or 1-adamantylacetic acid or 3-(1-adamantyl)acrylic acid with thionyl chloride, preferably by heating up to about reflux temperature.

Alternatively, those compounds of this invention wherein A is thia can be prepared by reacting a compound of the general formula VIII:

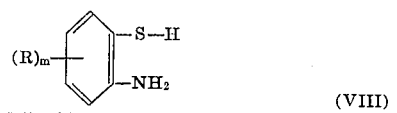

wherein R and m are as hereinbefore defined, with a compound of formula IV, the reaction being conducted in the presence of a strong base, such as sodamide, to yield a compound of the formula VI wherein A is thia and then reacting this compound with a compound of the formula VII as hereinbefore described. Suitable starting materials of the formula VIII utilizable in this process are compounds corresponding to the benzenethiols mentioned hereinbefore, with an amino group substituted for the nitro group.

Still another method for preparing the compounds of this invention entails the reaction of a compound of the general formula IX:

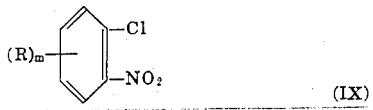

or its bromo counterpart wherein R and m are as hereinbefore defined, with a compound of the general formula X:

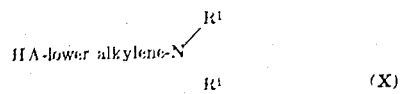

wherein $R^1$ is as hereinbefore defined, the reaction being conducted in the presence of a strong base, such as sodamide, to yield compounds of the general formula V, which are then treated as described hereinbefore to yield the product of this invention.

While A is sulfinyl or sulfonyl, these compounds of formula I may be obtained from the compounds of formula I wherein A is thia by oxidation with a suitable oxidizing agent such as hydrogen peroxide, potassium permanganate or a peracid such as peracetic acid.

Those compounds wherein A is carbonyl are obtained by reaction of a 2'-nitroacylphenone, such as 2'-nitroacetophenone or 2'-nitropropiophenone with formaldehyde and an amine. Alternately, the 2'-nitroacylphenone may be condensed with a basic halide to yield the desired nitro compound, which may then be reduced and acylated.

When A is hydroxymethylene, such compounds are obtained by the reduction with sodium borohydride of a compound of formula I in which A is carbonyl.

The symbols in all of the above formulas have the same meaning and hal refers to halogen, preferably chlorine or bromine.

Starting materials characterized by a substituted or unsubstituted adamantyl group may be obtained by a variety of methods. Fort et al., *Chemical Reviews* 64, 277(1964) provides a review of the methods of synthesis of various compounds and source material. See also U.S. Pat. No. 3,218,355, Nov. 16, 1965, U.S. Pat. No. 3,310,469, Mar. 21, 1967, U.S. Pat. No. 3,328,251, June 27, 1967 and Eire Pat. No. 342/64, Oct. 23, 1964.

For example, adamantaneamines or adamantylmethylamines may be obtained from adamantyl bromides by the method described by Gerzon et al., *J. Med. Chem.* 6, 760 (1963) according to the following general reaction scheme:

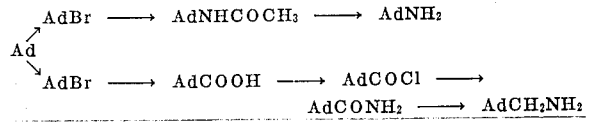

Adamantylethylamines may similarly be obtained from adamantyl bromides which may be converted to adamantylacetic acids by the method of Stetter et al., *Chem. Ber.* 92, 1629 (1963), then by the method of Gerzon et al. supra. converting the adamantyl acetic acid to the amide followed by reduction with lithium aluminum hydride, as described above, to the amine, according to the following reaction scheme:

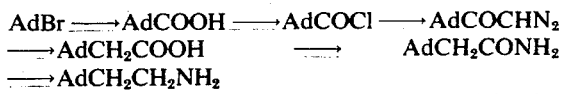

Obviously any of the intermediates indicated in the foregoing may be obtained by alternate methods described in the Fort et al. article or the sources reviewed therein.

The unsubstituted and substituted adamantanes which may be used as indicated above may be obtained by the isomerization method described by Fort et al. or by introduction of additional groups also as described in that article.

The bases of formula I form acid addition salts by reaction with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkane-sulfonate, e.g., methanesulfonate, arylsulfonate, e.g., benzene-sulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The bases of formula I also form quaternary ammonium salts, e.g., lower alkyl halides such as methyl chloride, methyl bromide, ethyl chloride, etc., lower alkyl sulfates such as methyl sulfate, ethyl sulfate, etc., monocyclic aryl (lower alkyl) halides and sulfates such as benzyl sulfate, etc. This is accomplished by reacting the base with the alkyl halide, sulfate, or the like.

The compounds of this invention are therapeutically active substances which possess serotonin inhibitory, hypotensive and analgesic activities. They are useful in the treatment of hypertension in animal species, e.g., rats, dogs, mice, in which case they may be administered orally or parenterally, at a dosage of about 0.2 to 8 mg/kg/day in single or divided doses preferably about 0.1 to 2 mg/kg two to four times daily, in the form of tablets, capsules, elixirs, injectables or the like by incorporating the base of formula I or a physiologically acceptable acid addition salt or quaternary ammonium salt thereof in a conventional vehicle along with excipients, lubricants, stabilizers, and the like according to accepted pharmaceutical practice. They may also be used to alleviate pain in such animals in the same manner and in the same dosage.

The following examples are illustrative of the invention. All temperatures are expressed on the centigrade scale.

EXAMPLE 1

Preparation of 2'-(3-dimethylaminopropylthio)-1-adamantane-carboxanilide, hydrochloride a. Preparation of 2-(3-dimethylaminopropylthio)aniline To a slurry of 29 grams of sodamide in 1 liter of toluene there is added a solution of 90 grams of 2-aminobenzenethiol in 300 ml. of toluene. The mixture is warmed on a steam bath for 30 minutes and then cooled to 30°. To this there is then added a solution of 93.5 grams of 3-dimethylaminopropyl chloride in 450 ml. of toluene. The resulting mixture is refluxed for 5 hours, cooled and treated with 100 ml. of cold water. The organic phase is separated and added slowly to a cold solution of 100 ml. of concentrated hydrochloric acid in 300 ml. of water. The mixture is shaken thoroughly and the aqueous layer separated, cooled and treated with a cold solution of 50 grams of sodium hydroxide in 100 ml. of water. The liberated base is extracted with ether and the combined ether extracts dried over anhydrous magnesium sulfate. After removal of the solvent by distillation, the residue is fractionally distilled under reduced pressure to yield the 2-(3-dimethylaminopropylthio)aniline as a pale yellow liquid boiling at 109°–113° at 0.1 mm.

b. Preparation of 1-adamantanecarboxylic acid chloride

Ten grams of 1-adamantanecarboxylic acid and 20 ml. of thionyl chloride are heated under reflux for 30 minutes. The excess thionyl chloride is removed by distillation under reduced pressure. To remove the last traces of thionyl chloride, 10 ml. of anhydrous benzene is added to the residue and the benzene removed by distillation under reduced pressure. The residue crystallizes upon cooling and is obtained in quantitative yield. The 1-adamantanecarboxylic acid chloride is used in (c) without further purification.

c. Preparation of 2'-(3-dimethylaminopropylthio)-1-adamantanecarboxanilide

To a cooled solution of 39.7 grams of 1-adamantanecarboxylic acid chloride in 400 ml. of chloroform there is added dropwise with vigorous stirring a solution of 42 grams of 2-(3-dimethyl-aminopropylthio)aniline in 150 ml. of chloroform. The temperature of the reaction mixture is maintained at 15°–20° during the addition and for one hour after the addition is completed. The reaction mixture is heated under reflux for 1 hour, and is then concentrated under reduced pressure to remove the chloroform.

Five hundred ml. of water is added to the residue and the mixture filtered and the filtrate made alkaline by the addition of a solution of 10 grams of sodium hydroxide in 100 ml. of water. The mixture is extracted with ether, and the combined ether extracts dried over anhydrous magnesium sulfate. Concentration of the ether leaves the desired 2'-(3-dimethylaminopropylthio)-1-adamantanecarboxanilide.

d. Preparation of 2'-(3-dimethylaminopropylthio)-1-adamantanecarboxanilide, hydrochloride A solution of 3.7 grams of 2'-(3-dimethylaminopropylthio)-1-adamantanecarboxanilide in anhydrous ethanol is treated with an equivalent amount of an ethereal hydrogen chloride solution. Anhydrous ether is added to complete the precipitation of the hydrochloride which may be recrystallized from a mixture of ethanol and ether.

EXAMPLE 2

Preparation of 2'-(3-dimethylaminopropylthio)-1-adamantylacetanilide, hydrochloride Following the procedure of Example 1, but substituting an equivalent amount of 1-adamantylacetic acid for the 1-adamantane-carboxylic acid in Example 1 (b), there is obtained 2'-(3-dimethylaminopropylthio)-1-adamantylacetanilide hydrochloride.

EXAMPLE 3

Preparation of 2'-(3-dimethylaminopropylthio)-3-(1-adamantyl)-acrylanilide hydrochloride a. Preparation of 3-(1-adamantyl)acrylic acid A mixture of 16.4 grams or 1-adamantanecarboxaldehyde, 10.4 grams of malonic acid and 9.3 grams of α-picoline is heated for 4 hours in a water bath at 70°, until the evolution of carbon dioxide ceases. The reaction mixture is then cooled and treated with 500 ml. of water to which is added 25 ml. of concentrated hydrochloride acid. The mixture is extracted with ether and the ether extracts then shaken with dilute aqueous sodium hydroxide. The sodium hydroxide solution is treated with decolorizing carbon, filtered and acidified with 20 percent sulfuric acid to precipitate the desired acid which is filtered and washed with water.

b. Preparation of 2'-(3-dimethylaminopropylthio)-3-(1-adamantyl)acrylanilide hydrochloride Following the procedure of Example 1, but substituting an equivalent amount of 3-(1-adamantyl)acrylic acid for the 1-adamantanecarboxylic acid in Example 1 (b), there is obtained 2'-(3-dimethylaminopropylthio)-3-(1-adamantyl)acrylanilide hydrochloride.

EXAMPLE 4

Preparation of 2'-(2-dimethylaminoethoxy)-3-(1-adamantyl)acryl-anilide hydrochloride a. Preparation of 2-(2-dimethylaminoethoxy)nitrobenzene A suspension of 27 grams of sodium methoxide in 850 ml. of isopropanol is treated with a solution of 70 grams of o-nitrophenol in 150 ml. of isopropanol. After 30 minutes a solution of 86 grams of 2-dimethylaminoethyl chloride in 350 ml. of toluene is added and the stirred reaction mixture is heated under reflex for 6 hours. The solvent is removed by distillation under reduced pressure and the cooled residue extracted with ether. The ether extracts are dried over anhydrous magnesium sulfate, the solvent removed by distillation and the residue fractionally distilled to yield the desired 2-(2-dimethylamino-ethoxy)nitrobenzene, boiling at 130°–135° at 0.3 mm.

b. Preparation of 2-(2-dimethylaminoethoxy)aniline

To a solution of 36 grams of 2-(2-dimethylaminoethoxy)-nitrobenzene in 100 ml. of absolute alcohol is added a slurry of 5 grams of palladium on carbon (5 percent) in 50 ml. of absolute alcohol. The mixture is placed in a Parr hydrogenation apparatus and shaken with hydrogen at 50 p.s.i. pressure. The uptake of hydrogen is complete in 30 minutes. The mixture is filtered, the alcohol removed by distillation and the residue is fractionally distilled to yield the desired 2-(2-dimethylamino-ethoxy)aniline, boiling at 100°–102° at 0.1 mm.

c. Preparation of 2'-(2-dimethylaminoethoxy)-3-(1-adamantyl)acrylanilide hydrochloride Following the procedure of Example 3, but substituting an equivalent amount of 2'-(2-dimethylaminoethoxy)aniline for the 2-(3-dimethylaminopropylthio)aniline there is obtained the desired 2'-(2-dimethylaminoethoxy)-3-(1-adamantyl)acryl-anilide hydrochloride.

EXAMPLE 5

Preparation of 2'-(3-dimethylaminopropylsulfonyl)-3-(1-adamantyl)-acrylanilide oxalic acid salt An aqueous solution of 6.5 grams of 2'-(3-dimethylamino-propylthio)-3-(1-adamantyl)acrylanilide hydrochloride is made basic (pH 10.5) by the addition of aqueous sodium hydroxide. The mixture is extracted with ether, the combined ether extracts dried over anhydrous magnesium sulfate and the solvent then removed by distillation. The residue is dissolved in 25 ml. of glacial acetic acid and treated with 7 ml. of 30 percent hydrogen peroxide. The temperature is maintained below 30° by occasional cooling in ice water. The reaction mixture is allowed to stand overnight at room temperature and is then diluted with 125 ml. of water. The cooled solution is made basic (pH 10.5) by the addition of potassium carbonate and the mixture extracted with ether. The combined ether extracts are dried over anhydrous magnesium sulfate and then added to a solution of 1.8 grams of oxalic acid in ether. The precipitated solid is filtered and washed with ether. The 2'-(3-dimethylaminopropylsulfonyl)-3-(1-adamantyl)acrylanilide oxalic acid salt thus obtained may be crystallized from a mixture of ethanol and ether.

EXAMPLE 6

Preparation of 2'-[3-(N-methyl-1-adamantylamino)propylthio]-cinnamanilide hydrochloride acid salt a. Preparation of N-(1-adamantyl)-3-chloro-N-methyl-propionamide With ice cooling and stirring, 37.1 grams of β-chloropropionyl chloride in 100 ml. of anhydrous benzene is added dropwise to 100 grams of 1-(methylamino)adamantane in 200 ml. of anhydrous benzene. The reaction mixture is then refluxed for five hours, filtered and the filtrate washed with water and dried over anhydrous magnesium sulfate. The ether is removed by distillation and the N-(1-adamantyl)-3-chloro-N-methylpropionamide thus obtained may be used without further purification. If desired, the product may be purified by fractional distillation.

b. Preparation of N-(3-chloropropyl)-N-methyl-1-adamantaneamide

To 38 grams of lithium aluminum hydride in 200 ml. of anhydrous ether is added dropwise a solution of 25 grams of N-(1-adamantyl)-3-chloro-N-methylpropionamide in 400 ml. of anhydrous ether. The mixture is then refluxed for 1 hour, cooled in ice, treated with 2.5 ml. of water and then 2.5 ml. of 20% aqueous sodium hydroxide. The mixture is filtered and dried over anhydrous potassium carbonate. The ether is removed by distillation and the residue is fractionally distilled under reduced pressure to yield the desired N-(3-chloropropyl)-N-methyl-1-adamantaneamine.

c. Preparation of 2-[3-N-methyl-1-adamantylamino)-propylthio]aniline

Following the procedure of Example 1 (a) but substituting an equivalent amount of N-(3-chloropropyl)-N-methyl-1-adamantanamine for the 3-dimethylaminopropyl chloride there is obtained 2-[3-(N-methyl-1-adamantylamino)propylthio]aniline.

d. Preparation of 2'-[3-(N-methyl-1-adamantylamino)-propylthio]cinnamanilide hydrochloride acid salt To a cooled solution of 33.4 grams of cinnamoyl chloride in 400 ml. of chloroform there is added dropwise, with vigorous stirring, a solution of 66 grams of 2-[3-(N-methyl-1-adamantyl-amino)propylthio]aniline in 150 ml. of chloroform. The temperature of the reaction mixture is maintained at 15°–20° during the addition and for 1 hour after the addition is completed. The reaction mixture is heated under reflux for 1 hour and is then concentrated under reduced pressure to remove the chloroform. Five hundred ml. of water is added to the residue, the mixture filtered and the filtrate made alkaline by the addition of a solution of 10 grams of sodium hydroxide in 100 ml. of water. The mixture is then extracted with ether and the combined ether extracts dried over anhydrous magnesium sulfate. Concentration of the ether leaves a residue of the desired 2'-[3-(N-methyl-1-adamantylamino)propylthio]cinnamanilide.

A solution of 4 grams of this base in anhydrous ethanol is treated with an equivalent amount of an ethereal hydrogen chloride solution. Anhydrous ether is added to complete the precipitation of the hydrochloric acid salt of 2'-[3-(N-methyl-1-adamantylamino)propylthio]cinnamanilide. This may be recrystallized from a mixture of ethanol and ether.

EXAMPLE 7

Preparation of 6'-[2-(diethylamino)ethoxy]-α,α,α-trifluoro-3-(1-adamantyl)-m-acrylotoluidide a. Preparation of 2-(2-nitro-4-trifluoromethylphenoxy)-triethylamine A slurry of 12.0 grams of a 50 percent sodium hydride dispersion in 1 liter of toluene is treated with a solution of 29.2 grams of diethylaminoethanol in 200 ml. of toluene. The mixture is heated to reflux for one hour and is then cooled to 45°. To this mixture there is then added a solution of 56.5 grams of 3-nitro-4-chlorobenzotrifluoride in 100 ml. of toluene and the mixture is refluxed for 4.5 hours. The reaction mixture is allowed to cool to room temperature and is then treated with 100 ml. of water. The aqueous layer is discarded and the organic phase is extracted with 10 percent hydrochloric acid. This acidic solution is then cooled and made strongly alkaline by the addition of aqueous sodium hydroxide. The mixture is extracted several times with ether, the ether extracts are combined, dried over anhydrous magnesium sulfate and concentrated to yield an oily residue of 2-(2-nitro-4-trifluoromethylphenoxy)triethylamine.

b. Preparation of 2-(2-diethylaminoethoxy)-5-trifluoro-methylaniline

A solution of 2-(2-nitro-4-trifluoromethylphenoxy)-triethylamine in absolute alcohol is treated with a suspension of 5 percent palladium on carbon and shaken in a Parr hydrogenator at 50 p.s.i. (initial pressure) of hydrogen until the theoretical amount of hydrogen is consumed. The catalyst is filtered and the solvent removed under reduced pressure to yield the desired 2-(2-diethylaminoethoxy)-5-trifluoromethylaniline.

c. Preparation of 6'-[2-(diethylamino)ethoxy]-α,α,α-trifluoro-3-(1-adamantyl)-m-acrylotoluidide Following the procedure of Example 1 but substituting the 2-(2-diethylaminoethoxy)-5-trifluoromethylaniline for an equivalent of the 2-(3-dimethylaminopropylthio)aniline and 3-(1-adamantyl)acrylic acid for an equivalent of the 1-adamantanecarboxylic acid there is obtained 6'-[2-(diethylamino)ethoxy]-α,α,α-trifluoro-3-(1-adamantyl)-m-acrylotoluidide.

EXAMPLE 8

Preparation of 2'-[4-(dimethylamino)butyryl]-(3-methyl-2-adamantane)-carboxanilide a. Preparation of 4-dimethylamino-2'-nitrobutyrophenone To a stirred solution of 3.5 grams of sodium in 350 ml. of 2-propanol there is added a solution of 25 grams of o-nitro-acetophenone in 100 ml. of 2-propanol. The temperature is maintained at 25°–30° by occasional cooling of the mixture with ice-water. The reaction mixture is then treated with 63 ml. of a 2.9 N. solution of 2-dimethylaminoethyl chloride in toluene and stirred for 8 hours.

The reaction mixture is then concentrated under reduced pressure and the residue suspended in water. The mixture is extracted several times with water, the combined ether extracts dried over anhydrous magnesium sulfate, treated with decolorizing carbon and filtered. The ether is removed by distillation and the residue distilled under reduced pressure to yield the desired 4-dimethylamino-2'-nitrobutyrophenone, boiling at 125°–140° at 0.3 mm.

b. Preparation of 2'-amino-4-dimethylaminobutyrophenone

A solution of the 4-dimethylamino-2'-nitrobutyrophenone in 120 ml. of absolute ethanol is treated with a suspension of 5 percent palladium on carbon and shaken in a Parr Hydrogenator at 50 p.s.i. (initial pressure) until the theoretical amount of hydrogen is consumed. The catalyst is filtered and the solvent removed by distillation under reduced pressure leaving as the residue the desired 2'-amino-4-dimethylaminobutyrophenone.

c. Preparation of 3-methyl-2-adamantanecarboxylic acid chloride

Twelve grams of 3-methyl-2-adamantanecarboxylic acid and 20 ml. of thionyl chloride are heated under reflux for 30 minutes. The excess thionyl chloride is removed by distillation under reduced pressure. Ten ml. of anhydrous benzene are added and the solvent again removed by distillation under reduced pressure to leave as a residue the desired 3-phenyl-2-adamantanecarboxylic acid chloride.

d. Preparation of 2'-[4-(dimethylamino)butyryl]-(3-methyl-2-adamantane)carboxanilide Following the procedure of Example 1 (c) but substituting an equivalent amount of 3-methyl-2-adamantanecarboxylic acid chloride for the 1-adamantanecarboxylic acid chloride and an equivalent amount of 2'-amino-4-dimethylaminobutyrophenone for the 2-(3-dimethylaminopropylthio)aniline there is obtained 2'-[4-(dimethylamino)butyryl]-(3-methyl-2-adamantane)carboxanilide.

EXAMPLE 9

Preparation of 5',6'-dimethoxy-2'-(3-dimethylaminopropylthio)-1-adamantanecarboxanilide hydrochloride Following the procedure of Example 1 but substituting 3,4-dimethoxy-2-aminobenzenethiol for an equivalent amount of 2-aminobenzenethiol there is obtained 5',6'-dimethoxy-2'-(3-dimethylaminopropylthio)-1-adamantanecarboxanilide hydrochloride.

EXAMPLE 10

Preparation of 2'-(3-dimethylaminopropionyl)-(3,5-dimethyl-1-adamantanecarboxanilide a. Preparation of 3-dimethylamino-2'-nitropropiophenone hydrochloride A mixture of 6 grams of o-nitroacetophenone 1.1 grams of paraformaldehyde and 3.0 grams of dimethylamine hydrochloride in 5 ml. of absolute ethanol is refluxed for 20 minutes. To the cooled reaction mixture acetone is added to precipitate the desired 3-dimethylamino-2'-nitropropiophenone hydrochloride, melting at 165°–167°.

b. Preparation of 2'-amino-3-(dimethylamino)propiophenone hydrochloride

A suspension of 3-dimethylamino-2'-nitropropiophenone hydrochloride in 150 ml. of absolute ethanol is treated with a suspension of 5 percent palladium on carbon and shaken in a Parr Hydrogenator at 50 p.s.i. (initial pressure) of hydrogen until the theoretical amount of hydrogen is consumed. The catalyst is filtered and the filtrate concentrated. Dilution of the residue with anhydrous ether yields the crystalline product. This is recrystallized from acetonitrile and the 2'-amino-3-(dimethylamino)-propiophenone hydrochloride thus obtained melts at 156°–158°.

c. Preparation of 3,5-dimethyl-1-adamantanecarboxylic acid chloride

Following the procedure of Example 1 (b) but substituting 3,5-dimethyl-1-adamantane carboxylic acid for the 1-adamantane carboxylic acid, there is obtained 3,5-dimethyl-1-adamantane-carboxylic acid chloride.

d. Preparation of 2'-(3-dimethylaminopropionyl)-(3,5-dimethyl-1-adamantane)carboxanilide Following the procedure of Example 1 (c) but substituting an equivalent amount of 3,5-dimethyl-1-adamantanecarboxylic acid chloride for the 1-adamantanecarboxylic acid chloride and an equivalent amount of 2'-amino-3-(dimethylamino)propiophenone (liberated from an aqueous solution of the hydrochloride by treatment with alkali) for the 2-(3-dimethylaminopropylthio)-aniline, there is obtained 2'-(3-dimethylaminopropionyl)-(3,5-dimethyl-1-adamantane)carboxanilide.

EXAMPLE 11

Preparation of 2'-(3-morpholinopropionyl)-(3-bromo-1-adamantane)-carboxanilide

Following the procedure of Example 10 but substituting morpholine hydrochloride for an equivalent amount of dimethyl-amine hydrochloride and 3-bromo-1-adamantanecarboxylic acid for an equivalent amount of 3,5-dimethyl-1-adamantanecarboxylic acid, there is obtained 2'-(3-morpholinopropionyl)-(3-bromo-1-adamantane)-carboxanilide.

EXAMPLE 12

Preparation of 2'-(3-morpholino-1-hydroxypropyl)-(3-bromo-1-adamantane)carboxanilide oxalic acid salt To a solution of 2'-(3-morpholinopropionyl)-(3-bromo-1-adamantane)carboxanilide in methanol there is added dropwise with vigorous stirring a solution of one molar equivalent of sodium borohydride in water. The reaction mixture is stirred for 10 hours after the addition is complete. The reaction mixture is then concentrated under reduced pressure and the residue dissolved in ether. The ether solution is dried over anhydrous magnesium sulfate, filtered and is treated with an equivalent amount of oxalic acid in anhydrous ether. The precipitated salt is filtered to yield the desired 2'-(3-morpholino-1-hydroxy-propyl)-(3-bromo-1-adamantane)carboxanilide, oxalic acid salt.

EXAMPLE 13

Preparation of 2'-(3-dimethylaminopropylsulfinyl)-3-(1-adamantyl)-acrylanilide oxalic acid salt An aqueous solution of 13 grams of 2'-(3-dimethylamino-propylthio)-3-(1-adamantyl)acrylanilide hydrochloride is made basic (pH 10.5) by the addition of aqueous sodium hydroxide. The mixture is extracted with ether, the combined ether extracts dried over anhydrous magnesium sulfate and the solvent is then removed by distillation. The residue is dissolved in 50 ml. of glacial acetic acid and treated with 7 ml. of 30 percent hydrogen peroxide. The temperature is maintained at 20°–25° by occasional cooling in ice-water. The reaction mixture is allowed to remain overnight at room temperature and is then diluted with 250 ml. of water. The cooled solution is made alkaline by the addition of potassium carbonate and the mixture is then extracted with ether. The combined ether extracts are dried over anhydrous magnesium sulfate and then added to a solution of 3.6 grams of oxalic acid in ether. The precipitated solid is filtered and washed with ether. The 2'-(3-dimethylaminopropylsulfinyl)-3-(1-adamantyl)acrylanilide oxalic acid salt thus obtained may be crystallized from a mixture of ethanol and ether.

Example 14

Preparation of 2'-[2-diethylamino)ethoxy]-5'-acetyl-3-(1-adamantyl)-acrylanilide Following the procedure of Example 7 but substituting an equivalent amount of 3'-nitro-4'-chloroacetophenone for the 3-nitro-4-chlorobenzotrifluoride there is obtained 2'-[2-(diethylamino)ethoxy]-5'-acetyl-3-(1-adamantyl)acrylanilide.

EXAMPLE 15

Preparation of 2'-[3-(4-methylpiperazino)propoxy]-1-adamantyl-acetanilide dihydrochloride a. Preparation of 2'-hydroxy-1-adamantylacetanilide To a stirred solution of 33 grams of o-aminophenol in 300 ml. of pyridine, cooled to 10°, there is added dropwise with vigorous stirring a solution of 64 grams of 1-adamantyl-acetyl chloride in 100 ml. of benzene. The reaction mixture is allowed to stand for 12 hours at room temperature and is then concentrated under reduced pressure. The residue is triturated with water and filtered. The solid is stirred for 20 minutes with 200 ml. of N sodium hydroxide solution, filtered and the filtrate acidified with dilute hydrochloric acid. The precipitated solid is filtered and air-dried to yield the desired 2'-hydroxy-1-adamantylacetanilide.

b. Preparation of 2'-(3-chloropropoxy)-1-adamantyl-acetanilide

A slurry of 21 grams of 2'-hydroxy-1-adamantylacetanilide in 80 ml. of 2-propanol is added with vigorous stirring to a solution of 4.1 grams of sodium in 200 ml. of 2-propanol. To this mixture there is then added 14 grams of trimethylene chloro-bromide and the reaction mixture is heated for 6 hours. The solvent is then removed by distillation under reduced pressure and the residue triturated with water and then with hexane to obtaine the 2'-(3-chloropropoxy)-1-adamantylacetanilide.

c. Preparation of 2'-[3-(4-methylpiperazino)propoxy]-1-adamantylacetanilide, dihydrochloride A solution of 12 grams of 2'-(3-chloropropyl)-1-adamantyl-acetanilide in 150 ml. of acetone is added to a solution of 5 grams of sodium iodide in 150 ml. of acetone and the reaction mixture is refluxed for 2 hours. The precipitated sodium chloride is removed by filtration and 6.7 grams of N-methyl-piperazine is added to the filtrate. The reaction mixture is refluxed for 8 hours.

The solvent is removed by distillation under reduced pressure and the residue is dissolved in water and made basic by the addition of aqueous sodium hydroxide. The mixture is extracted with ether and the ether extracts combined and washed several times with water. The ether solution is then dried over anhydrous magnesium sulfate, filtered and then concentrated under reduced pressure. The residue is dissolved in absolute ethanol and treated with an ethanolic solution of hydrogen chloride. Anhydrous ether is added to precipitate the dihydrochloride of 2'-[3-(4-methylpiperazino)propoxy]-1-adamantylacetanilide. This is filtered and washed with anhydrous ether. The salt may be recrystallized from a mixture of ethanol and ether.

EXAMPLE 16

Preparation of 2'-[3-[Bis(2-hydroxyethyl)amino]propoxy]-1-adamantylacetanilide, dihydrochloride Following the procedure of Example 15 but substituting an equivalent amount of diethanolamine for the N-methylpiperazine there is obtained 2'-[3-(bis(2-hydroxyethyl)amino)propoxy]-1-adamantylacetanilide, dihydrochloride.

The foregoing examples are illustrative of the procedures for synthesizing the compounds of this invention. Other compounds of this invention may similarly be obtained by replacing the starting materials in the above examples with other appropriately substituted compounds of the same class.

What is claimed is:

1. A compound selected from the group consisting of bases of the formula

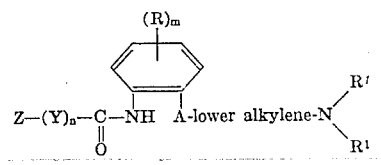

wherein R is a member of the group consisting of hydrogen, halogen, trifluoromethyl, nitro, amino, lower alkyl, lower alkoxy and lower alkanoyl; A is a member of the group consisting of oxa, thia, sulfinyl, sulfonyl, carbonyl and hydroxymethylene, Y is a one to two carbon saturated chain or CH=CH, Z is a member of the group consisting of adamantyl and 3—$R^2$, 5—$R^2$-adamantyl, but providing that Z is phenyl when $R^1$ is adamantyl, m is 1, n is an integer from 0 to 1, each $R^1$ is a member of the group consisting of hydrogen, adamantyl, 3—$R^2$—, 5—$R^2$-adamantyl, lower alkyl, hydroxy-lower alkyl and phenyl-lower alkyl, only one $R^1$ being an adamantyl group, and both $R^1$ together with the nitrogen to which they are attached form a member of the group consisting of piperidino, (lower alkyl)-piperidino, di(lower alkyl)piperidino, (lower alkoxy)piperidino, pyrrolidino, (lower alkyl)-pyrrolidino, di(lower alkyl)pyrrolidino, (lower alkoxy)pyrrolidino, morpholino, (lower alkyl)morpholino, di(lower alkyl)morpholino, (lower alkoxy)morpholino, thiamorpholino, (lower alkyl)-thiamorpholino, di(lower alkyl)-thiamorpholino, (lower alkoxy)thiamorpholino, piperazino, (lower alkyl)piperazino, hydroxy-lower alkylpiperazino, di(lower alkyl)-piperazino, hexamethyleneimino and homopiperazino, and $R^2$ is a member of the group consisting of hydrogen, halogen, lower alkyl, hydroxy, and acid addition salts of said bases.

2. A base as in claim 1 wherein R is hydrogen, m is 1, Z is 1-adamantyl, n is zero, A is thia and each $R^1$ is lower alkyl.

3. The base as in claim 2 wherein each lower alkyl group is methyl and the lower alkylene group is $CH_2CH_2CH_2$.

4. A base as in claim 1 wherein R is hydrogen, m is 1, Z is 1-adamantyl, Y is methylene, n is 1, A is thia and each $R^1$ is lower alkyl.

5. The base as in claim 4 wherein each lower alkyl group is methyl and the lower alkylene group is $CH_2CH_2CH_2$.

6. A base as in claim 1 wherein R is hydrogen, m is 1, Z is 1-adamantyl, Y is CH=CH, n is 1, A is thia and each $R^1$ is lower alkyl.

7. The base as in claim 6 wherein each lower alkyl group is methyl and the lower alkylene group is $CH_2CH_2CH_2$.

8. A base as in claim 1 wherein R is hydrogen, m is 1, Z is 1-adamantyl, Y is CH=CH, n is 1, A is sulfonyl and each $R^1$ is lower alkyl.

9. A base as in claim 1 wherein R is hydrogen, m is 1, Z is phenyl, Y is CH=CH, n is 1, A is thia, one $R^1$ is lower alkyl and the other $R^1$ is 1-adamantyl.

10. The base as in claim 9 wherein the lower alkyl group is methyl and the lower alkylene group is $CH_2CH_2CH_2$.

11. A base as in claim 1 wherein Z is 1-adamantyl

is a member of the group consisting of amino, lower alkyl-amino, di(lower alkyl)amino, (hydroxy-lower alkyl)amino, 1-adamantylamino, piperidino, piperazino, $N^4$-lower alkylpiperazino, $N^4$-(hydroxy-lower alkyl)-piperazino, morpholino and thiamorpholino.

* * * * *